Nov. 19, 1957     T. J. SAMBORSKI     2,813,724
SPRING CHUCK WITH SETTING MEANS
Filed Feb. 29, 1956
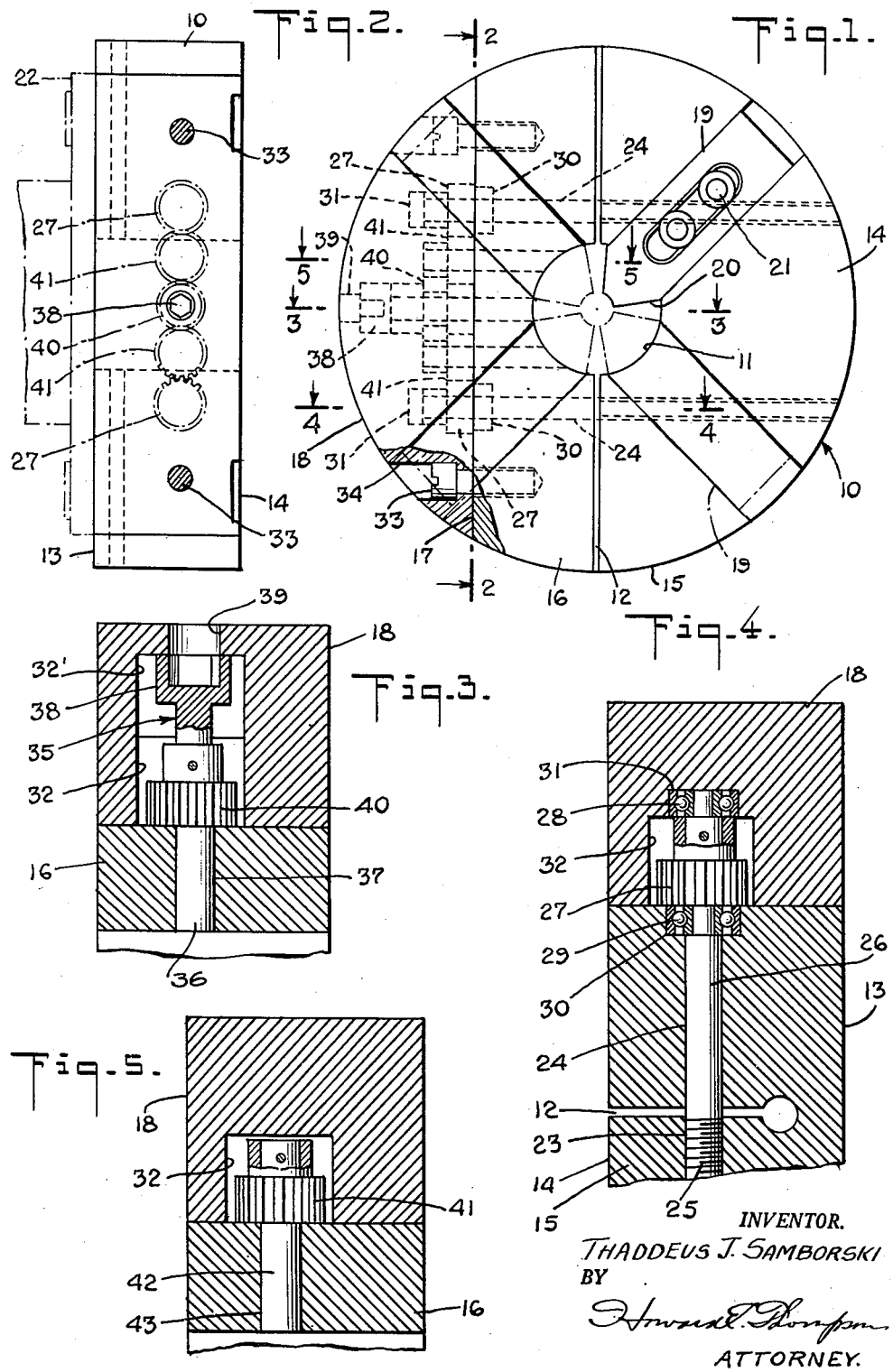
INVENTOR.
THADDEUS J. SAMBORSKI
BY
ATTORNEY.

2,813,724
SPRING CHUCK WITH SETTING MEANS

Thaddeus J. Samborski, Brooklyn, N. Y.

Application February 29, 1956, Serial No. 568,496

8 Claims. (Cl. 279—41)

This invention relates to a spring chuck in the form of a split circular body, with means comprising a chain of gears for moving the split halves toward and from each other in setting or clamping the chuck on a workpiece and in loosening the chuck for removal of the workpiece.

More particularly, the invention deals with a spring chuck body of the character described, wherein one half of the split portion of the chuck includes a detachable cap for housing and assisting in the support of gears of a gear train utilized in operation of the split halves of the chuck body.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a face view of a chuck body made according to my invention, diagrammatically indicating in dot-dash lines part of chuck jaws arranged thereon.

Fig. 2 is a section taken along the line 2—2 of Fig. 1, showing part of the construction in elevation, with parts in section, and diagrammatically illustrating in part in dot-dash lines an adaptor mounting.

Fig. 3 is a partial section on the line 3—3 of Fig. 1.

Fig. 4 is a partial section on the line 4—4 of Fig. 1; and

Fig. 5 is a partial section on the line 5—5 of Fig. 1.

In Fig. 1 of the drawing, I have shown, at 10, a substantially circular chuck body, having a large diameter bore 11 extending therethrough, the body having a deep split 12, which extends to a position adjacent the surface 13 of the body, as noted, for example, in Fig. 4 of the drawing, the split dividing the opposed surface portion 14 of the body into relatively movable, yieldable grippers 15 and 16.

Part of the gripper 16 is removed, as seen at 17, and the removed portion is replaced by a cap 18, the contour of which is concenrtic with the contour of a corresponding portion of the gripper 15, so that the outer circumference of the grippers 15 and 16 are circumferentially continuous and are of the same radius with respect to the axis of the chuck body.

The surface 14 of the grippers 15 and 16, including the cap 18, has radial shallow key grooves 19, in which chuck jaws, as indicated, in part, in full and dotted lines at 20, are adapted to be mounted. The mounting of the jaws is not shown in detail, as this mounting varies with different jaws by virtue of different centers of mounting screws, parts of which are indicated in dot-dash lines, as indicated at 21. In this connection and in considering Fig. 2 of the drawing, it will be apparent that a suitable adaptor mounting for the support of the chuck body 10 is indicated in part in dot-dash lines at 22, but, as the jaws 20 and mounting 22 form no direct part of the present invention, they are not illustrated in full lines in order to simplify the showing and to accentuate the structure of the chuck body itself.

The grippers 15 and 16 have, adjacent the bore 11, alined apertures 23 and 24, respectively, the aperture 23 being threaded to receive the threaded ends 25 of clamping screws 26.

Upper end portions of the screws 26 have fixed thereto gears 27, above and below which are bearings 28 and 29, the bearings 29 seating in sockets 30 of the jaw 16; whereas, the bearings 28 seat in sockets 31 of the cap 18, the sockets 31 opening into a long recess 32 in the inner surface of the cap 18. The recess 32 is sufficiently large to receive the gears 27, as well as other gears, later described.

The jaw 16 and cap 18 have alined apertures for receiving coupling screws 33, the heads of which are positioned in enlarged apertures 34 opening outwardly through the cap 18. Centrally of the cap 18 and jaw 16 is a driving unit 35 comprising a pin 36 extending into an aperture 37 of the jaw and having, within an enlarged outwardly extending portion 32' of the recess 32, a hexagon socket 38 exposed to an aperture 39 opening outwardly through the head for reception of an operating key.

Fixed to the pin 36 within the recess 32 is a main drive gear 40, which is adapted to drive the gears 27 through a pair of idlers 41, one of which is shown in detail in Fig. 5 of the drawing. Each of the idlers 41 are mounted on pins 42 extending into apertures 43 of the grippers 16, as clearly noted in said figure.

From the foregoing, it will be apparent that, upon insertion of an operating key into the socket 38 and rotation of the gear 40, the gears 27 will be operated to either draw the grippers 15, 16 toward each other or to separate said grippers in movement of the chuck into operative and inoperative positions with respect to a workpiece.

By arrangement of the screws 26 at opposed sides of the bore 11 of the chuck body, this leaves the bore free and clear for reception of the workpiece, which may be directly gripped by the chuck body itself or through the medium of chuck jaws, as diagrammatically indicated in Fig. 1 of the drawing. It will be apparent that the chuck jaws are adjustably supported in the grooves 19 to adapt them for engagement with workpieces within the range or diameter of the bore 11 in its normal extended position. By employing the cap 18 detachable with the gripper half 16 of the chuck body, the cost of production and assemblage of the chuck body is materially simplified.

It will also be apparent that the thrust bearings relieve the stress or strain to which the screws 26 are subjected, thus minimizing the manual power required for operating the screws in movement of the grippers 15 and 16 into workpiece engaging positions.

Having fully described my invention, what I claim as new and desire to secure by Letters Patent is:

1. A spring chuck of the character described, comprising a circular chuck body, having a large diameter bore, the body having a split extending the major portion of the depth of said body, to divide the body into a pair of grippers disposed on one surface of the body, a pair of screws mounted in one gripper and in threaded engagement with the opposed gripper adjacent opposed sides of the bore of said body for moving the grippers toward and from each other, gears on said screws in the first named gripper, manually operated means supported centrally of the first gripper, including a gear for drive of the gears of said screws, and a pair of idler gears supported in said first named gripper intermediate the screw gears and said second named gear for actuating the screw gears in rotation of said second named gear.

2. A spring chuck of the character described, comprising a circular chuck body, having a large diameter bore, the body having a split extending the major portion of the depth of said body to divide the body into a pair of grippers disposed on one surface of the body, a pair of screws mounted in one gripper and in threaded engagement with the opposed gripper adjacent opposed sides of the bore of said body for moving the grippers toward and from each other, gears on said screws in the first named gripper, manually operated means supported centrally of the first gripper, including a gear for drive of the gears of said screws, a pair of idler gears supported in said first named gripper intermediate the screw gears and said second named gear for actuating the screw gears in rotation of said second named gear, part of the first named gripper being removed, a cap mounted in the removed portion of the first gripper, and the inner surface of said cap being recessed to house said gears and said means.

3. A spring chuck of the character described, comprising a circular chuck body, having a large diameter bore, the body having a split extending the major portion of the depth of said body to divide the body into a pair of grippers disposed on one surface of the body, a pair of screws mounted in one gripper and in threaded engagement with the opposed gripper adjacent opposed sides of the bore of said body for moving the grippers toward and from each other, gears on said screws in the first named gripper, manually operated means supported centrally of the first gripper, including a gear for drive of the gears of said screws, a pair of idler gears supported in said first named gripper intermediate the screw gears and said second named gear for actuating the screw gears in rotation of said second named gear, part of the first named gripper being removed, a cap mounted in the removed portion of the first gripper, the inner surface of said cap being recessed to house said gears and said means, the outer surface of the cap being curved to conform with the contour of the chuck body, and said cap including bearing supports for said screws.

4. A spring chuck of the character described, comprising a circular chuck body, having a large diameter bore, the body having a split extending the major portion of the depth of said body to divide the body into a pair of grippers disposed on one surface of the body, a pair of screws mounted in one gripper and in threaded engagement with the opposed gripper adjacent opposed sides of the bore of said body for moving the grippers toward and from each other, gears on said screws in the first named gripper, manually operated means supported centrally of the first gripper, including a gear for drive of the gears of said screws, a pair of idler gears supported in said first named gripper intermediate the screw gears and said second named gear for actuating the screw gears in rotation of said second named gear, part of the first named gripper being removed, a cap mounted in the removed portion of the first gripper, the inner surface of said cap being recessed to house said gears and said means, the outer surface of the cap being curved to conform with the contour of the chuck body, said cap including bearing supports for said screws, and said first named gripper having bearing supports arranged on the screws adjacent said cap.

5. A spring chuck of the character described, comprising a circular chuck body, having a large diameter bore, the body having split extending the major portion of the depth of said body to divide the body into a pair of grippers disposed on one surface of the body, a pair of screws mounted in one gripper and in threaded engagement with the opposed gripper adjacent opposed sides of the bore of said body for moving the grippers toward and from each other, gears on said screws in the first named gripper, manually operated means supported centrally of the first gripper, including a gear for drive of the gears of said screws, a pair of idler gears supported in said first named gripper intermediate the screw gears and said second named gear for actuating the screw gears in rotation of said second named gear, and outer surfaces of said grippers having radially arranged key grooves.

6. A spring chuck of the character described, comprising a ring-like body defining a bore extending through both ends thereof, a deep slit in the body centrally and longitudinally of the bore and opening into said bore and through opposed sides and one end of the body to divide said end of the body into a pair of yieldable grippers, means comprising a pair of screws mounted in opposed grippers adjacent but outwardly of said bore for moving the grippers toward and from each other in the operation of the chuck, a manually operated drive unit embedded in and accessible through a peripheral surface of the chuck, and said unit comprising a gear train for transmitting movement of a drive element of said unit to the pair of screws simultaneously in operation of said grippers.

7. A spring chuck of the character described, comprising a ring-like body defining a bore extending through both ends thereof, a deep slit in the body centrally and longitudinally of the bore and opening into said bore and through opposed sides and one end of the body to divide said end of the body into a pair of yieldable grippers, means comprising a pair of screws mounted in opposed grippers adjacent but outwardly of said bore for moving the grippers toward and from each other in the operation of the chuck, a manually operated drive unit embedded in and accessible through a peripheral surface of the chuck, said unit comprising a gear train for transmitting movement of a drive element of said unit to the pair of screws simultaneously in operation of said grippers, a cap detachably mounted on the first mentioned gripper for housing the screws, drive element and gear train, and said cap conforming with the outer contour of said body.

8. A spring chuck of the character described, comprising a ring-like body defining a bore extending through both ends thereof, a deep slit in the body centrally and longitudinally of the bore and opening into said bore and through opposed sides and one end of the body to divide said end of the body into a pair of yieldable grippers, means comprising a pair of screws mounted in opposed grippers adjacent but outwardly of said bore for moving the grippers toward and from each other in the operation of the chuck, a manually operated drive unit embedded in and accessible through a peripheral surface of the chuck, said unit comprising a gear train for transmitting movement of a drive element of said unit to the pair of screws simultaneously in operation of said grippers, a cap detachably mounted on the first mentioned gripper for housing the screws, drive element and gear train, said cap conforming with the outer contour of said body, and said screws having bearing supports in said cap.

References Cited in the file of this patent

UNITED STATES PATENTS

| 855,592 | Schoenner | June 4, 1907 |
| 2,726,871 | Schnellman | Dec. 13, 1955 |

OTHER REFERENCES

The Tool Engineer, vol. XXIV, Issue No. 2, p. 46, published February 1950, Title: Chuck for Washers, 279–41. (Copy in Division 28.)